D. S. HOWARD.
Combined Rollers and Irrigators.
No. 140,043. Patented June 17, 1873.
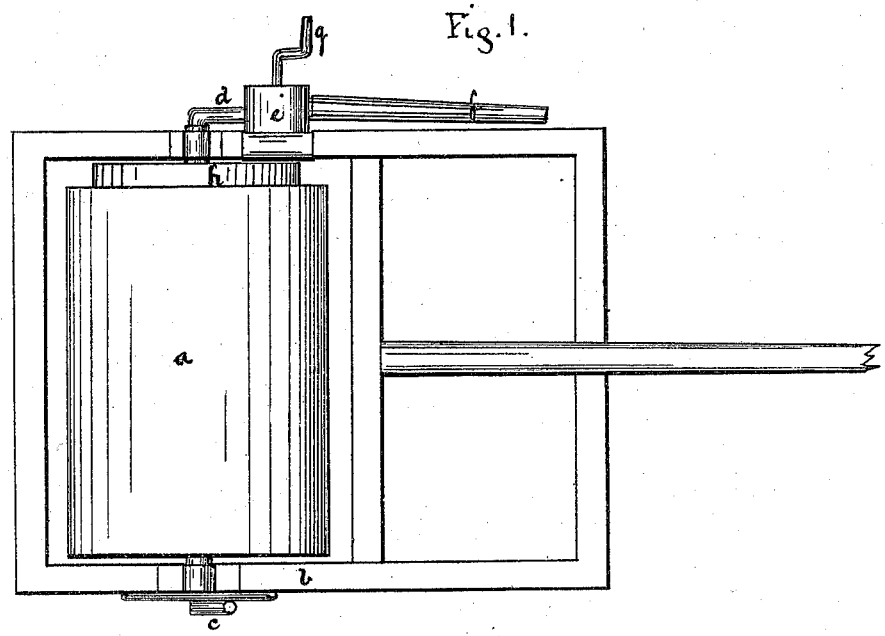
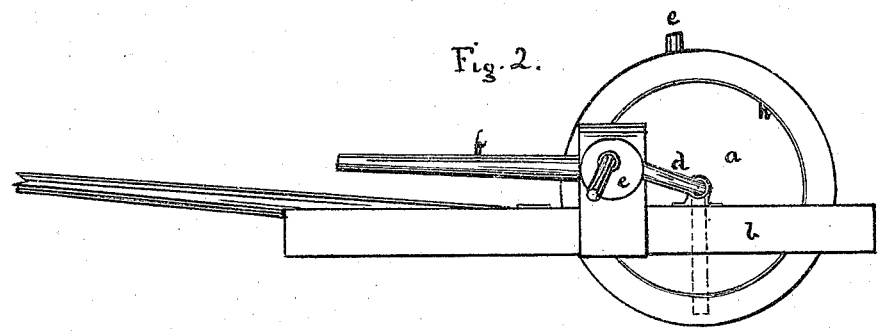
Witnesses.
Samuel Jones
Robert Emmett
Inventor.
Dean S. Howard
by Atty Thos. T. Everett

UNITED STATES PATENT OFFICE.

DEAN S. HOWARD, OF DRURY'S BLUFF, VIRGINIA.

IMPROVEMENT IN COMBINED ROLLERS AND IRRIGATORS.

Specification forming part of Letters Patent No. 140,043, dated June 17, 1873; application filed April 30, 1873.

*To all whom it may concern:*

Be it known that I, DEAN S. HOWARD, of Drury's Bluff, in the county of Chesterfield and State of Virginia, have invented a Combined Roller and Irrigator, of which the following is a specification:

My invention is designed to be used for agricultural purposes. In cultivating, many soils require rolling to reduce the lumps; other soils, again, require rolling to bring the earth properly in contact with the seed sown; hence a roller of weight will, in some instances, be requisite, while in other instances a light roller, comparatively, will be preferred. My invention provides for both conditions, as it can be used light or heavy, in this respect being adjustable. Combined with this adjustable roller are means for distributing water upon the soil, or for irrigation, these means being actuated by the revolution of the roller. The roller, $a$, is hollow, and can be filled with water. It can readily be cast with a sand core. Its short shafts are tubular. Through one of these shafts passes the feeding-pipe, $c$; through the other, the discharge-pipe, $d$, which, as is shown by the dotted lines in Fig. 2, passes quite down the interior of the roller. To the discharge-pipe a pump, $e$, is attached, with hose or distributing-pipe, $f$. The pump is a rotary, its inner end having affixed to it a friction-roller which is acted upon by the rim $h$ in the rotation of the roller. The interior of this rim may be toothed, and a pinion be used in place of the friction-roller. A reciprocating pump may be used in place of the rotary, suitable means being connected therewith to give it action by the movements of the roller. A proper frame, $b$, with shafts or tongue, is adapted to the roller, and irrigating devices.

From this brief description it will be readily seen that this apparatus may be used weighted or light, may be used as a roller only, or as an irrigator only, and may even be used for distributing liquid manures or fertilizers, the dimensions and means being adapted to the special object in view.

I claim as my invention—

A roller-irrigator, constructed and operated substantially as recited.

This specification signed this 25th day of April, 1873.

DEAN S. HOWARD.

Witnesses:
 THOS. T. EVERETT,
 ROBERT EVERETT.